United States Patent [19]

Sylvester et al.

[11] 3,772,814
[45] Nov. 20, 1973

[54] LATCH AND RELEASE MECHANISM FOR HARPOON AND FISHHOOK COMBINATION

[76] Inventors: Earl Oliver Sylvester; Ronald Sylvester, both of 1241 Sherman St., San Jose, Calif. 95110; Richard Sylvester, 285 Bangor Ave., San Jose, Calif. 95123

[22] Filed: Mar. 13, 1972

[21] Appl. No.: 234,055

[52] U.S. Cl. .................................................... 43/6
[51] Int. Cl. ............................................ A01k 81/00
[58] Field of Search ............................. 43/6, 15, 34

[56] References Cited
UNITED STATES PATENTS

| | | | |
|---|---|---|---|
| 611,400 | 9/1898 | Wenger | 43/34 |
| 2,179,597 | 11/1939 | Palsson | 43/6 |
| 2,179,598 | 11/1939 | Palsson | 43/6 |
| 3,444,642 | 5/1969 | Mastropolo | 43/6 |

FOREIGN PATENTS OR APPLICATIONS 503,935  12/1954  Italy ........................................ 43/6

*Primary Examiner*—Robert Peshock
*Assistant Examiner*—Daniel J. Leach
*Attorney*—Leslie M. Hansen

[57] ABSTRACT

A harpoon arranged for sliding movement in a sheath like body under the influence of a spring means and a latching means between the harpoon and sheath operatively associated with a bait line bearing against the latching means to release the same upon a tug on the bait line.

3 Claims, 5 Drawing Figures

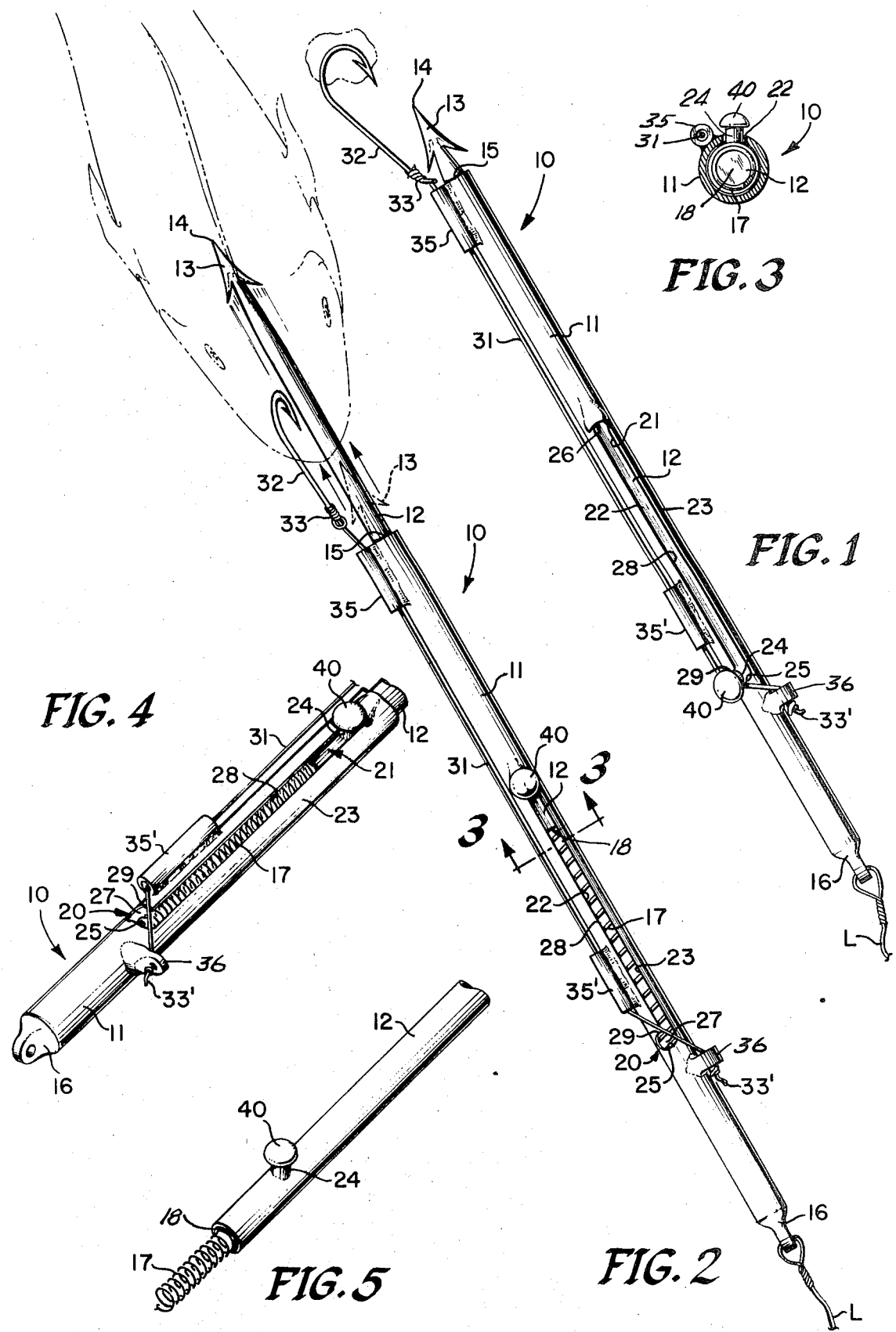

LATCH AND RELEASE MECHANISM FOR HARPOON AND FISHHOOK COMBINATION

BACKGROUND OF THE INVENTION

This invention relates to an improved bait line operated spring loaded harpoon in a guide structure and more particularly to a latching means between the harpoon and guide structure releasable by the bait line upon tautening thereof.

Bait line operated harpoons have heretofore been developed and are generally well known in the art. Among them are the invention of M.P. Palsson in either U.S. Pat. No. 2,179,597 and 2,179,598, both dated Nov. 14, 1939, relating to spoon and plug type harpoon devices. More recently U.S. Pat. No. 3,444,642, dated May 20, 1969, was granted to Mastropolo on a harpoon releasable by a tug on a bait line. In either case the latching means and release mechanism entailed a complicated system of levers and latches requiring difficulty in assembly. The structure of the Mastropolo patent is specific to a device constructed to receive and guide the bait line concentric to the harpoon shank for the guiding pivoted barbs thereon toward the fish attacking the bait on the line. This requires an intricate mechanism of numerous parts which are costly to manufacture and laborious to assemble.

THE PRESENT INVENTION

This invention relates to a latch and release mechanism for a harpoon and fishhook combination which is simple in construction, economical to manufacture and yet highly efficient and effective to manipulate and in use.

It is an object of this invention to provide in a stock sleeve-like body a guide for a shank of stock material having an exposed barbed end and an opposite end confined within the body against a compression spring therein; and further to provide a pin on the shank limited for guided movement in a slot formed in the body member together with a latching recess for the pin to maintain the harpoon shank in retracted condition until released.

It is another object to provide a bait line having a bait holding hook at one end adjacent the exposed barbed end of harpoon shank and means for guiding the bait line adjacent the sleeve-like body to a location just forward of the latching recess and diagonally over the latter to an anchoring eye on the body to facilitate unseating of the pin upon tautening of the bait line.

These and other objects and advantages of the present invention will become apparent from a reading of the following specification in the light of the drawing in which:

FIG. 1 is an elevational view of the device of the present invention set for operation, FIG. 2 is an elevational view similar to that of FIG. 1 with the harpoon released;

FIG. 3 is a cross section through FIG. 2 taken along line 3—3 thereof;

FIG. 4 is a fragmentary perspective view of a portion of FIG. 2; and

FIG. 5 is a fragmentary perspective view of the spring loaded end and latching pin of the harpoon shank of the present invention.

GENERAL DESCRIPTION

The present invention is in combination with a fishhook and harpoon device of the type generally designated 10 in the drawing. The device 10 includes a body member 11 of generally hollow tubular form to receive a rod like shank 12 of a harpoon 13 for guiding the latter for sliding movement therein. The harpoon 13 has a pointed end 14 which projects beyond an open end 15 of the body member, the opposite end 16 of which is closed. A compression spring 17 is arranged within the hollow body member 11 to bear against the closed end 16 of the latter and that end 18 of the harpoon shank 12 which is within the body member. The arrangement is such that the harpoon may be compressed against the spring 17 and is normally urged thereby outwardly of the open end 15 of the body member 11. The closed end 16 of the body member 11 is constructed to have a fish line L secured thereto in a conventional manner.

DETAILED DESCRIPTION OF THE INVENTION

The present invention has its embodiment in a latch and release means 20 for the harpooning device 10. The latching portion of the means 20 includes means 21 for limiting sliding movement of the shank 12 of the harpoon 13 to a desired length of stroke relative to the body member 11. The limiting means 21 is provided by a slot 22 formed in the wall 23 of the body member 11 and a pin 24 secured to the shank 12 of the harpoon and extending into the slot 22 for guidance therealong. The pin 24 is preferably disposed adjacent the inner end 18 of the harpoon shank 12 and the slot 22 has an aft end 25 disposed a distance from the closed end 16 of the body member sufficient to house the spring 17 in compressed condition within the latter. The opposite or fore end 26 of the slot 22 is disposed a sufficient distance from the open end 15 of the body member 11 to maintain the shank 12 in guided relation to the body member when the spring 17 is in spread or normally expanded condition.

The latching portion of means 20 further includes a notch 27 formed in one side edge 28 of the slot 22 of the body member and at the aft end 25 of the slot to receive the pin 24. The notch 27 has a seat 29 formed in its fore edge such as to hold the pin 24 theerein against the action of the spring 17 when the latter is in compressed condition. In this manner the shank 12 of the harpoon 13 is completely confined within the body member except for the projection of the pointed end 14 of the harpoon beyond the open end 15 of the body member 11. It should here be noted that the pointed end 14 of the harpoon is preferably, although not necessarily barbed for securing itself to an object which may become impaled thereon.

The release portion of the means 20 includes a bait line or snell 31 having a bait retaining hook 32 secured to one end 33 thereof and means for entraining the bait line upon the body member and relative to the latching portion 19 of the means 20. The entraining means includes grommets or guide sleeves 35 and 35' secured to the body member 11 and means 36 on the latter for anchoring the opposite end 33' of the bait line 31 to the body member.

In accordance with the present invention the guide sleeves 35-35' are disposed adjacent that edge 28 of the slot 22 into which the notch 27 is formed. The anchoring means 36 is disposed in alignment with the opposite edge of the slot 22 and rearwardly of the aft end 25 of the slot. The aft end of the rearmost guide sleeve 35' and the anchoring means are substantially equidistant from the notched region of the slot (FIG. 2) such that the bait line 31 extends diagonally across that region of the slot. Consequently, when the shank 12 of the harpoon 13 is forced back against the spring 17 the pin 24 must engage the biat line 31. Moreover, when the pin 24 is latched in seat 29 of the notch 27 it forces one portion of the aft end of the bait line outwardly of the slot 22 such that the remainder of the bait line becomes more acutely disposed. The bait line 31 thus partially skirts around the latched pin 24.

The outer end of the pin 24 is an enlarged knob 40 which in addition to serving as a handle for manipulating the pin also maintains the bait line in a pulley-like bearing relation with the reduced shank of the pin. In other words, the knob 40 prevents the bait line from slipping off the outer end of the pin 24. With the bait line thus diposed, the hooked end 33 thereof is drawn up into close proximity to the forward grommet or guide sleeve 35 such that the line, although not taut, is in ready position to unseat the pin 24 when the bait line is tautened.

It should now be apparent that when the baited hook 32 is pulled forwardly relative to the body member 11 the aft end of the bait line will be forced into diagonal disposition between the aft guide sleeve 35' and anchorage 36. Thus the pin 24 is unseated relative to the notch 27 and the harpoon shank 12 released for a forward thrust under the influence of the spring 17.

Having thus described the latch and release mechanism for a harpoon and fishhook combination in specific detail it will be appreciated that the same may be varied, altered and/or modified without departing from the spirit or scope of the invention therein as called for in the appended claims.

What we claim is:
1. In a harpoon and fishhook combination of the type having a harpoon arranged for guided sliding movement within a body member and backed by spring means within the body member for urging the pointed end of the harpoon therefrom; a latch and release mechanism comprising:
 1. means for limiting guided sliding mvoement of such harpoon relative to the body member including:
   a. a slot formed lengthwise the wall of said body member a distance the desired length of stroke of the harpoon therefrom; and
   b. a pin projecting from the harpoon into and through the slot formed in said body member.
 2. a notch formed in one side of the slot formed in said body member for communication therewith at that end thereof adjacent the spring means therein for receiving said pin on the harpoon for latching the latter in withdrawn condition against the action of the spring means in said body member; and
 3. a bait line guided for movement on said body member parallel to the notched side of the slot formed therein and having a bait retaining hook at that end thereof adjacent the pointed end of the harpoon and having its opposite end anchored to said body member aft of the non-notched side of the slot formed therein for disposing the bait line transversely of the slot to engage said pin and unseat the latter from the notch formed in the body member upon tautening of said bait line relative to said pin.

2. The harpoon and fishhook combination in accordance with that of claim 1 in which said pin includes an enlarged knob end for maintaining said bait line in engagement with said pin when the latter is latched in the notch formed in said body member and during tautening of said bait line.

3. The harpoon and fishhook combination in accordance with that of claim 2 including a guide sleeve formed on said body member adjacent the notched side of the slot formed therein and terminating slightly in advance of said notch and diagonally of the anchored end of said bait line for engagement by said pin as the latter becomes latched in said notch.

* * * * *